Patented Mar. 11, 1952

2,589,151

UNITED STATES PATENT OFFICE 2,589,151

THIOGLYCOLIC ACID ADDUCTS OF RUBBER-LIKE POLYMERS AND PROCESS OF PREPARING SAME

George Serniuk, Roselle, N. J., assignor to Standard Oil Development Company, a corporation of Delaware No Drawing. Application September 12, 1946, Serial No. 696,610

4 Claims. (Cl. 260—79.5)

The present invention pertains to the production of derivatives of synthetic rubber-like materials.

Synthetic rubber-like materials have been prepared by the polymerization of a conjugated diolefin or mixtures of conjugated diolefins or mixtures of one or more conjugated diolefins with unsaturated comonomers, capable of forming copolymerizates with diolefins under the reaction conditions applied. Unsaturated compounds having two conjugated double bonds which have been used for this purpose have included butadiene-1,3, isoprene, piperylene, dimethyl butadiene, chloroprene and the like. Unsaturated comonomers which have been used are styrene, homologues of styrene such as alpha methyl styrene, para methyl styrene, alpha methyl para methyl styrene, chloro- or bromo-styrenes, acrylonitrile, methacrylonitrile, chloro-acrylonitrile, acrylic acid esters such as methyl acrylate or methyl methacrylate and unsaturated ketones such as methyl vinyl ketone, methyl isopropenyl ketone and the like. The polymerization of these materials has been effected by means of sodium, by heat or mass polymerization, and most frequently by polymerization in aqueous emulsion. Both of these polymerization procedures will be referred to hereinafter generically as "heat polymerization" and the resulting products as "heat polymers," as distinguished from polymers prepared, for instance, by methods requiring refrigeration to temperatures below 0° C. during the polymerization reaction. In the latter case, the monomers are emulsified in from an equal to a two-fold quantity of water containing about 0.25 to about 5% based on the water of an emulsifier. Polymerization is catalyzed by small quantities of per-type compounds which are active under the reaction conditions, such as hydrogen peroxide, benzoyl peroxide, perborates and persulfates of ammonia or the alkali metals. Ordinarily a small amount i. e., about 0.1 to 1% based on the monomers, of a polymerization modifier such as aliphatic mercaptans containing at least six and up to about eighteen carbon atoms per molecule. The pH of the emulsion is usually adjusted to between about 7 and 10 when using soap-type emulsifiers, although the polymerization may be carried out at a pH below 7 by using certain acid-type emulsifiers such as the condensation products of ethylene oxide with certain amino, carboxy or hydroxy compounds, or amine salts such as dodecylamine hydrochloride. The polymerization is carried out at temperatures of about 20–60° C. until about 75% conversion of the monomers to polymers is effected.

The resultant polymers have found numerous applications as substitutes for natural rubber, and in view of certain properties, particularly resistance to hydrocarbon solvents, they have been found to be vastly superior to natural rubber and have commanded substantially higher prices than natural rubber. Polychloroprene and copolymers of a conjugated diolefin with an acrylonitrile have been particularly outstanding in this connection. Hydrocarbon synthetic rubbers, such as polybutadiene, polyisoprene, butadiene-styrene copolymers are not resistant to the solvating effects of liquid hydrocarbon solvents.

It is the object of this invention to convert rubbery hydrocarbon materials into derivatives which possess substantial resistance to the solvating action of liquid hydrocarbon solvents.

It is also the object of this invention to provide the art with certain novel, hydrocarbon-resistant rubber-like materials.

These and other objects will appear more clearly from the detailed specification and claims which follow.

It has now been found that mass or emulsion polymers or copolymers of butadiene-1,3 hydrocarbons are rendered resistant toward hydrocarbon solvents by partially saturating the double bonds of the polymer by means of thioglycolic acid or an ester thereof. The degree of hydrocarbon solvent resistance of the resulting adduct is a function of the number of double bonds saturated by means of the thioglycolic acid. Synthetic rubbers containing a substantial proportion of their unsaturation in side vinyl groups are highly reactive with thioglycolic acid until said side vinyl groups are saturated. Double bonds in the chain can also be reacted with thioglycolic acid, reaction therewith being facilitated if said double bonds are activated as by methyl groups in the case of polyisoprene. Butadiene-1,3 polymers or copolymers in which a part of the double bonds have been saturated by means of thioglycolic acid still retain their rubber-like properties to a fair degree, so that they may be worked on a rubber mill or the like, compounded, preformed and vulcanized in substantially the same way as the original polymer.

The condensation of thioglycolic acid with the polymer double bonds can be effected either by contacting water-free thioglycolic acid with the polymer in benzene solution in the presence of air or peroxide catalysts, or the polymer in latex form can be reacted with esters of thioglycolic acid in the presence of oxidants to yield ester-type adducts which can be converted to the desired acid derivative by hydrolysis. The reaction may be effected at room temperature or at elevated temperatures of up to about 150° C. The degree of saturation effected in a given time at a given temperature is dependent upon the nature of the double bonds present i. e., whether present in side-vinyl groups or in the chain, and whether activated by substituent groups or not. Ordinarily thioglycolic acid is added at the rate of one mol per mol of polymer double bonds whereupon excess thioglycolic acid is removed as by dissolving the reaction product or adduct in a mixture of benzene and isopropyl alcohol and washing the resultant solution free of thioglycolic acid with water. This purification step can be avoided by adjusting the amount of thioglycolic acid added to correspond with the number of reactive double bonds present or with which it is desired to effect reaction. Ordinarily less than half of the double bonds present in the polymer are reacted with thioglycolic acid in order that the adduct may be vulcanized in essentially the same way as the original polymer.

The polymers that may be treated in accordance with the present invention are those prepared by the polymerization in mass by sodium catalysis or in aqueous emulsion of conjugated diolefin hydrocarbons such as butadiene-1,3, or a major proportion of butadiene with a minor proportion of a hydrocarbon comonomer such as styrene, alpha methyl styrene, para methyl styrene or alpha methyl para methyl styrene and the like. The particular manner of preparing the polymers which are treated in accordance with the present invention are well known to the art and therefore a detailed description of the polymerization procedures is deemed unnecessary.

The following examples are illustrative of the present invention:

*Example 1*

A copolymer composed of 78 parts of butadiene and 22 parts of styrene of 76% conversion, was dissolved in a 5% concentration in benzene. To the benzene solution of the polymer was added gradually the calculated amount of dry thioglycolic acid (1 mol of thioglycolic acid/mol of polymer double bonds). After a short time of contact in the presence of air the solution began to cloud and shortly thereafter an exothermic reaction ensued. The reaction product separated from the benzene as an insoluble mass. The benzene insoluble product, after purification, was found to contain 12.60 per cent sulfur which corresponds to a 42 per cent polymer double bond saturation by thioglycolic acid. It was found to be capable of vulcanization essentially the same as the unreacted copolymer.

*Example 2*

A 10 gram sample of sodium polybutadiene was dissolved in 200 cc. of 100% benzol whereupon 15 cc. of dry thioglycolic acid (calculated amount to react with all of double bonds) were added. In the presence of air, in a very short time an exothermic reaction set in giving a 14° C. temperature rise.

The reaction product separated from the benzene as a bottoms layer. The product was solubilized by the addition of 50 cc. of n.butyl alcohol. The solution was washed repeatedly with water to remove unreacted thioglycolic acid whereupon the washed solution was stabilized with ditertiary butyl cresol and the solvent was stripped off on a steam bath. The adduct was dried in a vacuum oven for about 15 hours at 80° C.

Wijs No. of original polymer_____ 417.9
Per cent sulphur in adduct_____ 12.92
Per cent of double bonds saturated_____ 39

Samples of the original polymer and of the polymer adduct were placed in several solvents in order to compare solubility. The results are tabulated below:

| | Benzene | Benzene + Isopropyl Alc. | Naphtha | CCl$_4$ | Ethyl Ether | MEK |
|---|---|---|---|---|---|---|
| Polybutadiene-Thioglycolic Acid Adduct | Insol | Soluble | Insol | Insol | Slight Swell | Swells |
| Polybutadiene | Sol | Insol | Sol | Sol | Sol | Sol |

*Run illustrating slow reactivity of isoprene polymer*

Isoprene was polymerized in aqueous emulsion according to the following recipe:

Water, cc. _____ 190
5% sol. of Na salt of fatty acid, cc. _____ 168
Potassium persulfate, g. _____ 0.6
Water to dissolve K$_2$S$_2$O$_8$, g. ___ 25
K$_3$Fe(CN)$_6$, g. _____ 0.3
Water to dissolve K$_3$Fe(CN)$_6$, cc. ___ 25
Lorol mercaptan (a mixture of C$_{10}$ to C$_{18}$ aliphatic mercaptans, predominantly dodecyl mercaptan), cc. _____ 0.7
Isoprene, g. _____ 200
Reaction temp., ° C. _____ 46–50
Reaction time at 50° C., hrs. _____ 19¾
Reaction time at 46° C., hrs. _____ 19¾
Product, g. _____ 169
Conversion of monomer to polymer, per cent _____ 84.5

The polymer latex was stabilized with 36 cc. of a 0.5% solution of hydroquinone and 3.6 cc. of a 25% solution of N-phenyl-2-naphthylamine. The latex was coagulated by adding slowly to a large volume of 99% isopropyl alcohol. The coagulate was washed with distilled water on a mill. The sample was then mill dried at 175° F.

A 10 g. sample of the above polymer was dissolved in 200 cc. of 100% benzol. To this solution was added 30 cc. dry thioglycolic acid. No apparent reaction took place at room temperature. However, after standing overnight, a benzene insoluble adduct had separated as a bottom layer.

The foregoing description contains a limited number of embodiments of the present invention. It will be understood, however, that this invention is not limited to the specific conditions disclosed since numerous variations are possible without departing from the scope of the following claims.

What I claim and desire to secure by Letters Patent is:

1. Hydrocarbon insoluble polymer adducts produced by the process of claim 2.

2. The process which comprises dissolving in benzene a solid, synthetic, rubber-like emulsion copolymer of butadiene-1,3 with styrene, mixing the resulting solution with one mol of thioglycolic acid per mol of polymer double bonds in the presence of air at room temperature to saturate partially the double bonds of the copolymer and thereby forming a hydrocarbon-insoluble vulcanizable copolymer adduct.

3. The method which comprises mixing in the presence of oxygen a solid synthetic rubber-like copolymer of a major proportion of butadiene-1,3 and a minor proportion of styrene with a major amount of thioglycolic acid sufficient to react with 39% to 50% of the polymer double bonds, whereby a benzene-insoluble rubber-like solid is produced.

4. A vulcanizable rubber-like material of improved resistance to hydrocarbon solvents comprising solid rubber-like emulsion copolymer of a major proportion of butadiene-1,3 and a minor proportion of styrene, which copolymer has about 42% of the polymer double bonds reacted with thioglycolic acid.

GEORGE SERNIUK.

REFERENCES CITED

The following references are of record in the file of this patent:

UNITED STATES PATENTS

| Number | Name | Date |
| --- | --- | --- |
| 2,227,517 | Starkweather | Jan. 7, 1941 |
| 2,287,773 | Bacon | June 30, 1942 |
| 2,287,774 | Bacon | June 30, 1942 |

FOREIGN PATENTS

| Number | Country | Date |
| --- | --- | --- |
| 542,645 | Great Britain | Jan. 21, 1942 |

OTHER REFERENCES

Holmberg (1) Berichte der deutschen Chem. Gesellschaft, vol. 65B, pages 1349–54 (1932).

Holmberg (2) Rubber Chem. and Technol., vol. 20, pages 978–81 (1947) (translation of article in Arkiv Kemi, Mineral, Geol.)

Serniuk, Journ. Amer. Chem. Soc., vol. 70, pages 1804–1808.